(12) United States Patent
Matsui et al.

(10) Patent No.: US 9,862,794 B2
(45) Date of Patent: Jan. 9, 2018

(54) CO-CONDENSATE AND METHOD FOR PRODUCING THE SAME, AND RUBBER COMPOSITION CONTAINING THE SAME

(71) Applicant: Taoka Chemical Co., Ltd., Osaka-shi, Osaka (JP)

(72) Inventors: Kazuhiro Matsui, Osaka (JP); Nobuyuki Sato, Osaka (JP); Yoshiteru Ota, Osaka (JP)

(73) Assignee: TAOKA CHEMICAL CO., LTD., Osaka-Shi (JP)

( * ) Notice: Subject to any disclaimer, the term of this patent is extended or adjusted under 35 U.S.C. 154(b) by 56 days.

(21) Appl. No.: 14/779,922

(22) PCT Filed: Mar. 19, 2014

(86) PCT No.: PCT/JP2014/057503
§ 371 (c)(1),
(2) Date: Sep. 24, 2015

(87) PCT Pub. No.: WO2014/156870
PCT Pub. Date: Oct. 2, 2014

(65) Prior Publication Data
US 2016/0046754 A1 Feb. 18, 2016

(30) Foreign Application Priority Data

Mar. 26, 2013 (JP) .................. 2013-063689
Aug. 6, 2013 (JP) .................. 2013-162858

(51) Int. Cl.
| | |
|---|---|
| C08G 8/22 | (2006.01) |
| C08G 8/24 | (2006.01) |
| C08L 21/00 | (2006.01) |
| C08L 81/06 | (2006.01) |
| C08L 7/00 | (2006.01) |
| C08L 61/12 | (2006.01) |

(52) U.S. Cl.
CPC .................. *C08G 8/22* (2013.01); *C08G 8/24* (2013.01); *C08L 7/00* (2013.01); *C08L 21/00* (2013.01); *C08L 61/12* (2013.01); *C08L 81/06* (2013.01); *C08L 2205/06* (2013.01)

(58) Field of Classification Search
CPC ............... C08G 8/24; C08G 8/22; C08G 8/12
USPC ........................................ 525/132
See application file for complete search history.

(56) References Cited

U.S. PATENT DOCUMENTS

| | | | | |
|---|---|---|---|---|
| 4,148,655 A | * | 4/1979 | Itoh .................. | C08G 8/24 430/197 |
| 4,837,086 A | * | 6/1989 | Takahashi ............ | C08G 8/24 174/259 |
| 5,717,053 A | | 2/1998 | Inui et al. | |
| 6,159,405 A | * | 12/2000 | Taylor ................. | C08G 8/10 264/169 |
| 6,265,482 B1 | * | 7/2001 | Taylor ................. | C08L 61/06 524/439 |
| 2006/0069191 A1 | * | 3/2006 | Durairaj .............. | C08G 8/10 524/284 |
| 2006/0241276 A1 | * | 10/2006 | Inatomi ............... | C08G 8/28 528/129 |
| 2010/0209810 A1 | * | 8/2010 | Yashiro ............... | C08G 8/10 429/483 |
| 2012/0101211 A1 | * | 4/2012 | Fujiki ................. | C08G 8/22 524/511 |
| 2015/0144835 A1 | * | 5/2015 | Kosugi ................ | C08G 8/10 252/73 |

FOREIGN PATENT DOCUMENTS

| | | |
|---|---|---|
| CN | 1141643 A | 1/1997 |
| CN | 101928412 A | 12/2010 |
| JP | 06-234824 A | 8/1994 |
| TW | 200413445 A | 8/2004 |
| WO | WO-95/18842 A1 | 7/1995 |

OTHER PUBLICATIONS

Translation of the Journal of the Society of Rubber Science and Technology, Japan, vol. 73 (2000), No. 9, pp. 488-493 (Abstract).*
Office Action issued in Chinese Patent Application No. 201480017997.X dated Jul. 20, 2016.
Office Action issued in Taiwanese Patent Application No. 103110917 dated Oct. 26, 2016.
The Journal of the Society of Rubber Science and Technology, Japan, vol. 73 (2000), No. 9, pp. 488-493 (Abstract).

* cited by examiner

*Primary Examiner* — Mike M Dollinger
(74) *Attorney, Agent, or Firm* — Foley & Lardner LLP

(57) ABSTRACT

The present invention provides a co-condensate containing a structural unit derived from p-tert-butylphenol, a structural unit derived from o-phenylphenol, and a structural unit derived from resorcin, and having a softening point of 150° C. or lower; a method for producing the co-condensate including reacting a mixture of p-tert-butylphenol and o-phenylphenol with formaldehyde in the presence of an alkali, and then reacting resorcin in a 0.8-fold molar amount or more relative to a total amount of p-tert-butylphenol and o-phenylphenol; and a rubber composition containing the co-condensate.

10 Claims, No Drawings

CO-CONDENSATE AND METHOD FOR PRODUCING THE SAME, AND RUBBER COMPOSITION CONTAINING THE SAME

CROSS REFERENCE TO RELATED APPLICATIONS

The present application is the U.S. National Stage of International Application No. PCT/JP2014/057503, filed on Mar. 19, 2014, which claims priority to Japanese Application No. 2013-063689, filed on Mar. 26, 2013, and Japanese Application No. 2013-162858, filed Aug. 6, 2013. The contents of these applications are hereby incorporated herein by reference.

TECHNICAL FIELD

The present invention relates to a co-condensate (phenolic resin) obtained from an alkylphenol and the like, and a method for producing the co-condensate, as well as a rubber composition obtained using the co-condensate.

BACKGROUND ART

In rubber articles such as tires, belts, hoses, and the like, which need to be reinforced with any of reinforcements such as steel cords, organic fibers, and the like, strong adhesion between the rubber and the reinforcement is demanded. For providing adhesion between the rubber and the reinforcement, a method in which the reinforcement is treated with any of various adhesives, and a method in which an adhesive is blended together with various other compounding agents in a processing step (kneading step) of rubber, are known. In particular, the method in which an adhesive is blended in the processing step of rubber is widely used, since this method achieves strong vulcanization adhesion, regardless of the presence or absence of an adhesive treatment for the reinforcement. As an adhesive used in this processing step of rubber, a co-condensate is known obtained by reacting an alkylphenol such as p-tert-octylphenol, p-nonylphenol, or the like with formalin to produce a co-condensate, and by reacting the co-condensate with resorcin. [For example, Japanese Patent Laying-Open No. 06-234824 (PTD 1)].

In recent years, however, p-tert-octylphenol and p-nonylphenol are among candidate substances of very high concern (SVHCs) defined by the Registration, Evaluation, Authorization and Restriction of Chemicals (REACH) Regulation within the EU region, and their use within the EU region is more likely to be restricted from now on.

Under such circumstances, the present inventors substituted these substances with p-tert-butylphenol, which is one of p-substituted phenols not included in the list of candidate SVHCs defined by the REACH Regulation, and is available at low cost, to produce the co-condensate described above. As a result, they ascertained that the co-condensate has a very high softening point. Adhesives used in the processing step of rubber are demanded to soften in the rubber processing step, and in the field of rubber for tires where co-condensates (phenolic resins) are commonly used as adhesives, it is known that the rubber processing step is generally performed at around 170° C. [for example, see the Journal of the Society of Rubber Science and Technology, Japan, Vol. 73 (2000), No. 9, pp. 488-493 (NPD 1)]. Hence, in order to ensure that the co-condensate is softened and dispersed in rubber in the rubber processing step, the softening point of the co-condensate is required to be sufficiently lower than a maximum temperature during the rubber processing, that is, 150° C. or lower.

CITATION LIST

Patent Document

PTD 1: Japanese Patent Laying-Open No. 06-234824

Non Patent Document

NPD 1: the Journal of the Society of Rubber Science and Technology, Japan, Vol. 73 (2000), No. 9, pp. 488-493

SUMMARY OF INVENTION

Technical Problem

An object of the present invention is to provide a novel co-condensate for an adhesive used in the field of rubber articles reinforced with reinforcements, which contains p-tert-butylphenol, instead of p-tert-octylphenol and p-nonylphenol of which use may be restricted under laws and regulations, and yet has a sufficiently low softening point and has excellent dispersibility in rubber, and also to provide a method for producing the co-condensate, as well as a rubber composition containing the co-condensate.

Solution to Problem

The present inventors conducted extensive research to solve the aforementioned problem, and consequently found that a co-condensate further containing a structural unit derived from o-phenylphenol, in addition to structural units derived from p-tert-butylphenol and resorcin, exhibits a significantly decreased softening point, and such a co-condensate can be provided as a novel co-condensate containing p-tert-butylphenol which be suitably used as an adhesive used in the field of rubber articles reinforced with reinforcements. Furthermore, the inventors found at the same time that through optimization of production conditions for the above-described co-condensate, the free resorcin content in the co-condensate can be reduced while achieving a softening point of 150° C. or lower.

That is, the present invention includes a co-condensate and a method for producing the co-condensate, and a rubber composition containing the co-condensate, as itemized below.

[1] A co-condensate containing:
a structural unit derived from p-tert-butylphenol represented by Formula (1):

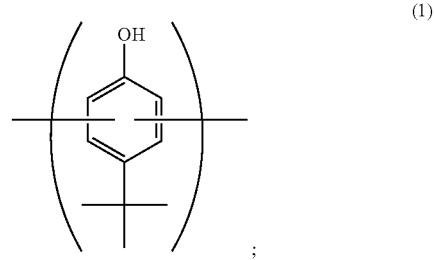

a structural unit derived from o-phenylphenol represented by Formula (2):

and a structural unit derived from resorcin represented by Formula (3):

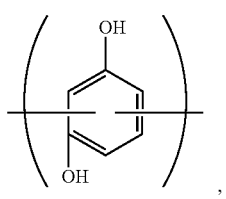

the co-condensate having a softening point of 150° C. or lower.

[2] The co-condensate according to [1], wherein
a free resorcin content is 5 wt % or lower.

[3] The co-condensate according to [1] or [2], wherein
the co-condensate is a condensate of p-tert-butylphenol, o-phenylphenol and resorcin, and formaldehyde.

[4] A method for producing the co-condensate according to any of [1] to [3], including, in a following order, the steps of:

reacting a mixture of p-tert-butylphenol and o-phenylphenol with formaldehyde in the presence of an alkali; and further reacting resorcin in a 0.8-fold molar amount or more relative to a total amount of p-tert-butylphenol and o-phenylphenol.

[5] The method for producing the co-condensate according to [4], including the steps of:

reacting the mixture of p-tert-butylphenol and o-phenylphenol with formaldehyde in the presence of the alkali; and mixing the resulting co-condensate with resorcin, and reacting the mixture at 120° C. or higher, in the presence of a solvent in a 0.2-fold amount by weight or more relative to the total amount of p-tert-butylphenol and o-phenylphenol, until the free resorcin content in the reaction mixture is reduced to 5 wt % or less.

[6] The method for producing the co-condensate according to [4] or [5], wherein
resorcin is used in a 2.0-fold molar amount or less relative to the total amount of p-tert-butylphenol and o-phenylphenol.

[7] A rubber composition containing the co-condensate according to any of [1] to [3].

Advantageous Effects of Invention

According to the present invention, a co-condensate can be provided that can be obtained using p-tert-butylphenol as a raw material, which is inexpensive and generally readily available, that is efficiently dispersed in rubber during kneading, that is capable of strengthening the adhesion between a reinforcement and the rubber obtained by vulcanizing the kneaded product, and that is unlikely to be subject to restrictions on use under laws and regulations in the future. Furthermore, since the free resorcin content in the co-condensate can be reduced to 5 wt % or less, as required, a novel co-condensate having reduced fuming of resorcin while satisfying the above-described features, and a method for producing the co-condensate, can be provided.

DESCRIPTION OF EMBODIMENTS

The present invention will be described in detail below.
<Co-Condensate>
A co-condensate (phenolic resin) of the invention has a feature in that it contains a structural unit derived from p-tert-butylphenol represented by Formula (1):

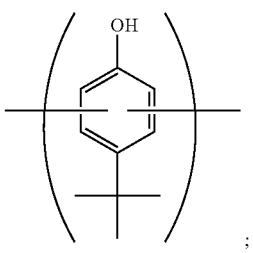

a structural unit derived from o-phenylphenol represented by Formula (2):

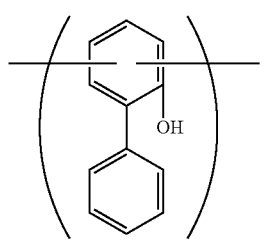

and
a structural unit derived from resorcin represented by Formula (3):

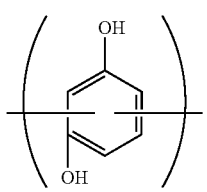

Note that while these structural units are generally contained in the main chain of the co-condensate, in some cases, they may be contained in a side chain.

Among these structural units, if the co-condensate does not contain structural unit (2) derived from o-phenylphenol, the softening point will become high, leading to the problem of poor dispersibility when compounded into rubber during kneading. As a result, the co-condensate will be unsuitable as an adhesive for rubber and a reinforcement that is used by being compounded into the rubber during kneading. Moreover, if the co-condensate does not contain structural unit (3) derived from resorcin, it will not demonstrate sufficient performance as an adhesive for rubber and a reinforcement that is used by being compounded into the rubber during kneading. Furthermore, if the co-condensate does not contain structural unit (1) derived from p-tert-butylphenol, the price of the co-condensate will be very high, making it impossible to obtain the co-condensate industrially advantageously.

While the proportions of these structural units are not particularly limited, generally, structural unit (2) derived from o-phenylphenol is preferably contained in a 0.5- to 6-fold molar amount, and more preferably 1.5- to 6-fold molar amount, per mole of structural unit (1) derived from p-tert-butylphenol. If the amount of structural unit (2) is less than a 0.5-fold molar amount, the softening point may become excessively high to cause the problem as described above, whereas if the amount is greater than a 6-fold molar amount, the raw material cost of the co-condensate may become too high to industrially advantageously produce the co-condensate according to the invention.

Structural unit (3) derived from resorcin is generally contained in a 0.5- to 2.0-fold molar amount per mole of a total amount of structural unit (1) derived from p-tert-butylphenol and structural unit (2) derived from o-phenylphenol. If the amount of structural unit (3) is less than a 0.5-fold molar amount, the co-condensate may not demonstrate sufficient performance as an adhesive for rubber and a reinforcement that is used by being compounded into the rubber during kneading, whereas if the amount is greater than a 2.0-fold molar amount, industrial production of the co-condensate may become difficult.

Generally, these structural units are bonded by bond groups such as alkyl groups and/or alkyl ether groups derived from aldehyde used in the reaction. Particularly preferable as such bond groups are methylene groups and/or dimethylene ether groups derived from formaldehyde. The bond groups are generally contained in a 1- to 2-fold molar amount per mole of the total amount of structural unit (1) derived from p-tert-butylphenol and structural unit (2) derived from o-phenylphenol.

The proportions of these structural units or bond groups can be determined by analyzing the co-condensate using $^1$H-NMR, for example. Specifically, the proportion of each of the structural units or bond groups may be determined by, for example, analyzing the co-condensate using $^1$H-NMR, and determining the proportion from a proton integral value derived from each of the structural unit or bond groups among the obtained analytical results.

The co-condensate of the invention can optionally contain structural units other than the structural units derived from p-tert-butylphenol, o-phenylphenol, and resorcin. Examples of such structural units include structural units derived from various alkylphenols used as raw materials of co-condensates commonly used as adhesives used in the processing step of rubber.

The softening point of the co-condensate of the invention must be 150° C. or lower. The softening point is preferably in the range of 80 to 150° C., more preferably 80 to 140° C., and particularly preferably 90 to 120° C. If the softening point is higher than 150° C., the co-condensate may not be dispersed well when kneaded with a rubber component, leading to the problem of poor dispersibility when compounded into rubber during kneading. As a result, the co-condensate may become unsuitable as an adhesive for rubber and a reinforcement that is used by being compounded into the rubber during kneading. If the softening point is lower than 80° C., blocking may occur during storage.

While a total amount of unreacted monomers (free p-tert-butylphenol, o-phenylphenol and resorcin) contained in the co-condensate of the invention is not particularly limited, it is preferably 15 wt % or less. An amount of 15 wt % or less can reduce odor, and thus, is environmentally preferable. In particular, the free resorcin content is preferably 5 wt % or less. If the free resorcin content is less than 5 wt %, when the co-condensate is added to rubber, the fuming of resorcin that occurs during kneading of the co-condensate into the rubber is suppressed. This significantly improves the work environment, and thus, is particularly preferable.

A total amount of p-tert-butylphenol and o-phenylphenol as unreacted monomers other than free resorcin, and of residual solvent that may be used in the reaction, contained in the co-condensate of the invention, is preferably 5 wt % or less. An amount of 5 wt % or less can reduce odor, and also reduces the amount of volatile organic compounds, which is environmentally preferable.

<Method for Producing Co-Condensate>

A method for producing a co-condensate according to the present invention includes, in the following order, the steps of:

[a] reacting a mixture of p-tert-butylphenol and o-phenylphenol with formaldehyde in the presence of an alkali to obtain a resol-type condensate; and

[b] further reacting resorcin in a 0.8-fold molar amount or more relative to a total amount of p-tert-butylphenol and o-phenylphenol.

While the proportion of o-phenylphenol in the mixture of p-tert-butylphenol and o-phenylphenol (these two phenols may be collectively referred to as the "phenol derivatives" hereinafter) used in step [a] is not particularly limited, it is preferably 35 mol % to 85 mol %, more preferably 40 mol % to 85 mol %, and still more preferably 60 mol % to 85 mol %, relative to the total amount of the phenol derivatives. If the proportion is less than 35 mol %, the softening point of the resulting co-condensate will become high, such that the co-condensate may not be dispersed well when kneaded with a rubber component. If the proportion is greater than 85 mol %, a large amount of expensive o-phenylphenol will be required, such that the co-condensate may not be produced industrially advantageously. Note that the mixture of p-tert-butylphenol and o-phenylphenol in the invention includes, in addition to a mixture formed prior to being introduced into the reactor, a mixture formed in the reactor as a result of p-tert-butylphenol and o-phenylphenol being introduced separately into the reactor.

Examples of formaldehyde used in step [a] include, in addition to formaldehyde itself, a compound that easily generates formaldehyde, such as formalin as an aqueous solution, or paraformaldehyde or trioxane. While the molar ratio of formaldehyde supplied is not particularly limited, it is preferably a 1- to 3-fold molar amount, and particularly preferably in the range of 1.5- to 2.5-fold molar amounts, relative to the total amount of the phenol derivatives. If the amount of formaldehyde is less than a 1-fold molar amount, the amount of the unreacted monomers may increase to cause odor and the amount of volatile organic compounds to increase. On the other hand, if the amount is greater than a 3-fold molar amount, a large amount of formaldehyde may remain unreacted, such that the resin may form a three-dimensional structure to cause the softening point to increase.

Examples of the alkali include, in addition to hydroxides or carbonates of alkali metals or alkaline earth metals, alkalis used for producing general resol-type condensates, such as ammonia, amines, and the like. Specific examples of hydroxides or carbonates of alkali metals or alkaline earth metals include sodium hydroxide, potassium hydroxide, calcium hydroxide, sodium carbonate, potassium carbonate, and the like. Among the above, sodium hydroxide and potassium hydroxide are preferable. While these alkalis can be used as solids or aqueous solutions, an alkali as an aqueous solution is preferably used in view of reactivity and ease of handling. When an alkali as an aqueous solution is used, the concentration of the aqueous solution used is generally 10 wt % to 50 wt %. While the molar ratio of the alkali supplied is not particularly limited, it is preferably in the range of 0.03- to 0.6-fold molar amounts, and more preferably 0.03- to 0.3-fold molar amounts, relative to the total amount of the phenol derivatives.

The reaction in step [a], that is, the reaction of the mixture of p-tert-butylphenol and o-phenylphenol with formaldehyde, can also be performed in a solvent. The solvent used is not particularly limited, and water, an alcohol, an aromatic hydrocarbon, or the like can be used. More specifically, examples of the solvent include water, methanol, ethanol, propanol, butanol, toluene, xylene, ethylbenzene, cumene, monochlorobenzene, and the like. Among the above, water, toluene, and xylene are preferable. These solvents can be used alone or as a combination of two or more. When the solvent is used, it is generally used in a 0.4- to 4-fold amount by weight (for example, 0.4- to 2-fold amount by weight), relative to the total amount of the phenol derivatives. The reaction in step [a] is generally performed for a reaction time of 1 to 48 hours (for example, 1 to 8 hours) at a reaction temperature of 40 to 100° C.

The resol-type condensate obtained by this reaction may be directly used in the reaction of step [b], that is, the reaction with resorcin, without neutralizing the alkali used. Alternatively, the resol-type condensate may be used after neutralizing the alkali by the addition of an acid. While the type of the acid used for neutralization is not particularly limited, examples of the acid include hydrochloric acid, sulfuric acid, nitric acid, phosphoric acid, formic acid, acetic acid, oxalic acid, p-toluenesulfonic acid, and the like. Only one of these acids may be used alone, or a mixture of two or more acids may be used. At this time, while a total amount of the acid used is not particularly limited, generally, the acid is preferably used in an amount equivalent to the alkali used (in terms of the amount of substance). Furthermore, in order to remove such substances as unreacted formaldehyde and inorganic salts produced from neutralization, an additional treatment may be performed, as required, in which the resol-type condensate is extracted and washed with an organic solvent not miscible with water.

In step [b], the molar ratio of resorcin supplied for reacting the obtained resol-type condensate and resorcin must be a 0.5-fold molar amount or more relative to the total amount of the phenol derivatives, preferably 0.8- to 4.0-fold molar amount, more preferably 0.8- to 2.0-fold molar amount, and still more preferably 1.0- to 2.0-fold molar amount. If the molar ratio of resorcin is greater than a 4.0-fold molar amount, a large amount of unreacted resorcin may remain, leading to the problem of volatility. If the molar ratio of resorcin is lower than a 0.5-fold molar amount, the reaction may not be completed, resulting in a failure to obtain the inherent performance, or the reaction of molecules of the resol-type condensate with each other may proceed preferentially to cause polymerization of the obtained co-condensate, resulting in a failure to achieve a softening point of 150° C. or lower.

While the reaction of the resol-type condensate and resorcin can be performed without solvent, the reaction is preferably performed in the presence of a solvent in a 0.2-fold amount by weight or more relative to the total amount of p-tert-butylphenol and o-phenylphenol, because this reduces the free resorcin content to 5 wt % or less. More preferably, the reaction is performed in the presence of a solvent in a 0.4- to 4.0-fold amount by weight, and particularly preferably in a 0.4- to 2.0-fold amount by weight, relative to the total amount of p-tert-butylphenol and o-phenylphenol. If the amount of the solvent is less than a 0.2-fold amount by weight, the reaction of molecules of the resol-type condensate with each other may proceed preferentially over the reaction of resorcin and the resol-type condensate, and possibly because of the polymerization of the resulting co-condensate, the free resorcin content cannot be reduced to 5 wt % or less. Moreover, although the reaction proceeds even if the solvent is used in a 4.0-fold amount by weight or more, the volume efficiency will decrease, making it impossible to produce the co-condensate economically advantageously.

Examples of usable solvents includes, although not limited to, alcohols, ketones, aromatic hydrocarbons, and the like. More specifically, examples of such solvents include methanol, ethanol, propanol, butanol, methyl isobutyl ketone, diisobutyl ketone, cyclohexanone, toluene, xylene, ethylbenzene, cumene, monochlorobenzene, and the like. Among the above, ketones and aromatic hydrocarbons are preferable, and more specifically, methyl isobutyl ketone, toluene, and xylene are preferable. These solvents can be used alone or as a combination of two or more, as required. As the solvent, the solvent used for producing the resol-type condensate may be directly used, or a new solvent may be added as appropriate.

The reaction of the resol-type condensate and resorcin is generally performed for a reaction time of 1 to 48 hours (for example, 1 to 8 hours) at a reaction temperature of 40 to 150° C., although the reaction conditions are not particularly limited thereto.

In order to reduce the free resorcin content in the co-condensate to 5 wt % or less, it is preferable to perform the reaction at 120° C. or higher until the free resorcin content in the reaction mixture is reduced to 5 wt % or less, prior to performing a solvent removal step described below. If free resorcin remains in an amount greater than 5 wt % at the stage of this reaction, high-temperature, high-vacuum-degree conditions that are industrially difficult to apply will be required to reduce the free resorcin content to less than 5 wt % simultaneously with the below-described solvent removal step. Moreover, the co-condensate then obtained will undergo coloration or polymerization due to heat. As a result, the softening point will exceed 150° C., making the co-condensate unsuitable as an adhesive for rubber and a reinforcement that is used by being compounded into the rubber during kneading.

To perform the reaction at 120° C. or higher means that the temperature may be 120° C. or higher at a given point in time during the reaction. For example, at the initial stage of the reaction, the reaction may be started at a temperature lower than 120° C., and then the temperature may be gradually increased to 120° C. or higher. If the reaction temperature never reaches 120° C. or higher, the free resorcin content in the reaction mixture will not be reduced to 5 wt % or less. Moreover, as described above, if this reaction is performed in the absence of a solvent in a 0.2-fold amount by weight or more, the free resorcin content will not be reduced to 5 wt % or less, possibly because of the polymerization of the resulting co-condensate. The reaction mixture refers to all that are contained in the reaction vessel, such as the resol-type condensate, resorcin, solvent, and the like, which are raw materials of this reaction. The resorcin content in the reaction mixture can be quantified through analysis using a gas chromatograph, for example. Note that in order to reduce the free resorcin content, it may be possible to simply reduce the amount of the raw material resorcin used. With this method, however, the amount of the raw material resorcin will be insufficient during the reaction, and instead, the resorcin sites in the co-condensate will undergo further reaction for polymerization, leading to a very high softening point.

In the reaction of the resol-type condensate and resorcin in step [b], the reaction rate tends to be slow if water is present within the system, and the reaction rate may decrease due to the water produced by the reaction of the resol-type condensate and resorcin. It is thus preferable to perform the reaction with dehydration, for the purpose of promoting the reaction. Preferably, in this dehydration reaction, in order to sufficiently remove the water produced in the reaction, dehydration is performed under reduced pressure at the beginning of the reaction, and then in order to increase the internal temperature to 120° C., further dehydration is performed at atmospheric pressure.

When a solvent is used for the reaction of the resol-type condensate and resorcin, generally, the solvent used in the reaction is removed after the reaction. While the conditions for removing the solvent are not particularly limited, the solvent is removed at 120 to 160° C. under a reduced pressure corresponding to an internal pressure of 45 to 10 kPa, for example. Note that while this solvent removal operation can reduce the free resorcin content to a certain extent, if the free resorcin content in the reaction mixture before the solvent removal is greater than 5 wt %, high-temperature, high-vacuum-degree conditions that are industrially difficult to apply will be required to reduce the free resorcin content in the co-condensate after the solvent removal to 5 wt % or less, and moreover, the co-condensate then obtained will undergo coloration due to heat, leading to a lower product value.

<Rubber Composition>

Next, a rubber composition containing the co-condensate according to the invention will be described in detail.

The rubber composition of the invention contains the above-described co-condensate and a rubber component, and can typically be obtained by kneading the co-condensate, the rubber component, a filler, and sulfur. Together with these components, a vulcanization accelerator, zinc oxide, a formaldehyde-generating agent or a methylene-donor compound, and an organic cobalt compound can also be kneaded.

While the amount of the above-described co-condensate used is not particularly limited, the co-condensate is generally used in an amount in the range of 0.5 to 10 parts by weight per 100 parts by weight of the rubber component. In particular, the co-condensate is preferably used in an amount in the range of 1 to 5 parts by weight. If the amount is less than 0.5 part by weight, the co-condensate will not have a useful function as an adhesive for a reinforcement and rubber, whereas if the amount is greater than 10 parts by weight, an effect commensurate with the amount of the co-condensate added will not be demonstrated although the above-described function will not be impaired, which is economically undesirable.

Examples of the rubber component include natural rubbers, epoxidized natural rubbers, deproteinized natural rubbers, and other modified natural rubbers, as well as various synthetic rubbers such as polyisoprene rubber (IR), styrene butadiene copolymer rubber (SBR), polybutadiene rubber (BR), acrylonitrile butadiene copolymer rubber (NBR), isoprene isobutylene copolymer rubber (IIR), ethylene propylene-diene copolymer rubber (EPDM), halogenated butyl rubber (HR), and the like. Highly saturated rubbers such as natural rubbers, styrene butadiene copolymer rubber, polybutadiene rubber, and the like are preferably used. A natural rubber is particularly preferable. A combination of several types of rubber components is also effective, such as a natural rubber and styrene butadiene copolymer rubber in combination, or a natural rubber and polybutadiene rubber in combination.

Examples of the natural rubber may include natural rubbers of grades such as RSS#1, RSS#3, TSR20, SIR20, and the like. As an epoxidized natural rubber, an epoxidized natural rubber having a degree of epoxidation of 10 to 60 mol % is preferable, and such examples may include ENR25 and ENR50 manufactured by Kumpulan Guthrie Berhad. As a deproteinized natural rubber, a deproteinized natural rubber having a total nitrogen content of 0.3 wt % or less is preferable. As a modified natural rubber, a modified natural rubber containing polar groups obtained by previously reacting a natural rubber with 4-vinylpyridine, N,N-dialkylaminoethylacrylate (for example, N,N-diethylaminoethylacrylate), 2-hydroxyacrylate, or the like, is preferably used.

Examples of SBR may include emulsion polymerized SBR and solution polymerized SBR described on pages 210 to 211 of "*Gomu Kogyo Binran* (Rubber Industry Handbook) <4th edition>", edited by the Society of Rubber Science and Technology, Japan. In particular, solution polymerized SBR is preferably used, and particularly preferably used are commercially available products of solution polymerized SBR terminally modified with 4,4'-bis-(dialkylamino)benzophenone, such as "NIPOL® NS116" manufactured by Zeon Corporation, solution polymerized SBR terminally modified with a halogenated tin compound, such as "SL574" manufactured by JSR Corporation, and silane-modified solution polymerized SBR, such as "E10" or "E15" manufactured by Asahi Kasei Corporation; and solution polymerized SBR having any of nitrogen, tin, and silicon, or two or more of these elements, at molecular terminal(s) obtained by modifying the molecular terminal(s) using any of a lactam compound, an amide compound, an urea-based compound, an N,N-dialkyl acrylamide compound, an isocyanate compound, an imide compound, a silane compound having an alkoxy group (trialkoxysilane compound or the like), and an amino silane compound alone, or using two or more different compounds among those described above, such as the tin compound and the silane compound having an alkoxy group, or the alkyl acrylamide compound and the silane compound having an alkoxy group.

Examples of BR include solution polymerized BR such as high cis BR containing 90% or more of cis 1,4-bonds and low cis BR containing around 35% of cis bonds. The low cis BR having a high vinyl content is preferably used. Particularly preferably used are tin-modified BR such as "NIPOL® BR 1250H" manufactured by Zeon Corporation; and solution polymerized BR having any of nitrogen, tin, and silicon, or two or more of these elements, at molecular terminal(s) obtained by modifying the molecular terminal(s) using any of 4,4'-bis-(dialkylamino)benzophenone, a halogenated tin compound, a lactam compound, an amide compound, an urea-based compound, an N,N-dialkyl acrylamide compound, an isocyanate compound, an imide compound, a silane compound having an alkoxy group (trialkoxysilane compound or the like), and an amino silane compound alone, or using two or more different compounds among those described above, such as the tin compound and the silane compound having an alkoxy group, or the alkyl acrylamide compound and the silane compound having an alkoxy group. These types of BR are generally used as blends with natural rubbers.

The rubber component preferably contains a natural rubber, and the proportion of the natural rubber in the rubber component is preferably 70 wt % or more.

Examples of the filler include carbon black, silica, talc, clay, aluminum hydroxide, titanium oxide, and the like, which are commonly used in the field of rubber. Among the above, carbon black and silica are preferably used, and carbon black is particularly preferably used. Examples of the carbon black include those described on page 494 of "*Gomu Kogyo Binran* (Rubber Industry Handbook) <4th edition>", edited by the Society of Rubber Science and Technology, Japan, and carbon blacks such as HAF (High Abrasion Furnace), SAF (Super Abrasion Furnace), ISAF (Intermediate SAF), FEF (Fast Extrusion Furnace), MAF, GPF (General Purpose Furnace), SRF (Semi-Reinforcing Furnace), and the like are preferable. For use in a rubber composition for tire treads, carbon black having a CTAB surface area of 40 to 250 $m^2/g$, a nitrogen adsorption specific surface area of 20 to 200 $m^2/g$, and a particle size of 10 to 50 nm is preferable, and carbon black having a CTAB surface area of 70 to 180 $m^2/g$ is more preferable. Examples thereof include N110, N220, N234, N299, N326, N330, N330T, N339, N343, N351, and the like under ASTM standards. Surface-treated carbon black in which 0.1 to 50 wt % of silica has been attached to the surface of carbon black is also preferable. Moreover, a combination of several types of fillers is also effective, such as carbon black and silica in combination.

Examples of the silica include silica having a CTAB specific surface area of 50 to 180 $m^2/g$ and silica having a nitrogen adsorption specific surface area of 50 to 300 $m^2/g$, and commercially available products such as "AQ" and "AQ-N" manufactured by Tosoh Silica Corporation, "ULTRASIL®VN3", "ULTRASIL® 360", and "ULTRASIL® 7000" manufactured by Degussa, "ZEOSIL® 115GR", "ZEOSIL® 1115MP", "ZEOSIL® 1205MP", and "ZEOSIL® Z85MP" manufactured by Rhodia, "NIPSIL® AQ" manufactured by Nippon Silica Industries, and the like, are preferably used. Generally, when silica is used as the filler, it is preferable to add a compound having an element such as silicon or a functional group such as an alkoxysilane capable of bonding to silica, for example, one or more silane coupling agents selected from the group consisting of bis (3-triethoxysilylpropyl)tetrasulfide ("Si-69" manufactured by Degussa), bis(3-triethoxysilylpropyl)disulfide ("Si-75" manufactured by Degussa), bis(3-diethoxymethylsilylpropyl)tetrasulfide, bis(3-diethoxymethylsilylpropyl)disulfide, and octanethioic acid S-[3-(triethoxysilyl)propyl] ester ("NXT silane" manufactured by General Electronic Silicones).

Examples of the aluminum hydroxide include aluminum hydroxides having a nitrogen adsorption specific surface area of 5 to 250 $m^2/g$ and a DOP oil absorption of 50 to 100 ml/100 g.

While the amount of the above-described filler used is not particularly limited, it is preferably in the range of 10 to 120 parts by weight per 100 parts by weight of the rubber component. Particularly preferably, the amount of the filler is 30 to 70 parts by weight.

The filler preferably contains carbon black, and the proportion of the carbon black in the filler is preferably 70 wt % or more.

Examples of the sulfur component include powdered sulfur, precipitated sulfur, colloidal sulfur, insoluble sulfur, highly dispersible sulfur, and the like. Generally, powdered sulfur is preferable, and insoluble sulfur is preferable for use in a tire part containing a large amount of sulfur, such as a part for a tire belt or the like. While the amount of the sulfur component used is not particularly limited, it is preferably in the range of 1 to 10 parts by weight per 100 parts by weight of the rubber component. In a part for a tire belt or the like, the amount of the sulfur component is preferably in the range of 5 to 10 parts by weight.

Examples of the vulcanization accelerator include thiazole-based vulcanization accelerators, sulfenamide-based vulcanization accelerators, and guanidine-based vulcanization accelerators described on pages 412 to 413 of "*Gomu Kogyo Binran* (Rubber Industry Guidebook) <4th edition>" (published by the Society of Rubber Science and Technology, Japan, Jan. 20, 1994).

Specific examples of these vulcanization accelerators include N-cyclohexyl-2-benzothiazolylsulfenamide (CBS), N-tert-butyl-2-benzothiazolylsulfenamide (BBS), N,N-dicyclohexyl-2-benzothiazolyl sulfenamide (DCBS), 2-mercaptobenzothiazole (MBT), dibenzothiazyl disulfide (MBTS), diphenylguanidine (DPG), and the like. Among the above, it is preferable to use diphenylguanidine (DPG) in combination with N-cyclohexyl-2-benzothiazolylsulfenamide (CBS), N-tert-butyl-2-benzothiazolylsulfenamide (BBS), N,N-dicyclohexyl-2-benzothiazolyl sulfenamide (DCBS), or dibenzothiazyl disulfide (MBTS).

While the amount of the vulcanization accelerator used is not particularly limited, it is preferably in the range of 0.5 to 3 parts by weight per 100 parts by weight of the rubber component. Particularly preferably, the vulcanization accelerator is used in an amount in the range of 0.5 to 1.2 parts by weight.

While the amount of zinc oxide used is not particularly limited, it is preferably in the range of 3 to 15 parts by weight per 100 parts by weight of the rubber component. Particularly preferably, zinc oxide is used in an amount in the range of 5 to 10 parts by weight.

Examples of the formaldehyde-generating agent include those commonly used in rubber industry, such as hexamethylenetetramine, hexakis(methoxymethyl) melamine, pentakis(methoxymethyl)methylolmelamine, tetrakis (methoxymethyl)dimethylolmelamine, and the like. Among the above, hexakis(methoxymethyl)melamine alone or a mixture containing hexakis(methoxymethyl)melamine as a main component is preferable. These formaldehyde-generating agents can be used alone or as a combination of two or more. The amount of the formaldehyde-generating agent compounded is preferably in the range of about 0.5 to 4 parts by weight, and more preferably in the range of about 1 to 3 parts by weight, per 100 parts by weight of the above-described rubber component.

Examples of the organic cobalt compound include an acid cobalt salt such as cobalt naphthenate or cobalt stearate, a fatty acid cobalt-boron complex compound (for example, trade name "MANOBOND C®"; Rhodia), and the like. The amount of the organic cobalt compound used is preferably in the range of 0.05 to 0.4 part by weight, in terms of its cobalt content, per 100 parts by weight of the above-described rubber component.

The rubber composition of the invention can also be compounded and kneaded with various compounding agents conventionally used in the field of rubber. Examples of such compounding agents include an antioxidant, an oil, a retarder, a peptizer, stearic acid, and the like.

Examples of the antioxidant include those described on pages 436 to 443 of "*Gomu Kogyo Binran* (Rubber Industry Guidebook) <4th edition>", edited by the Society of Rubber Science and Technology. Among the above, N-phenyl-N'-1, 3-dimethylbutyl-p-phenylenediamine (6PPD), the reaction product of aniline and acetone (TMDQ), poly(2,2,4-trimethyl-1,2-dihydroquinoline) ("Antioxidant FR" manufactured by Matsubarasangyo Corporation), synthetic waxes (paraffin wax and the like), and vegetable waxes are preferably used.

Examples of the oil include process oils, vegetable oils and fats, and the like. Examples of process oils include paraffinic process oils, naphthenic process oils, aromatic process oils, and the like.

Examples of the retarder include phthalic anhydride, benzoic acid, salicylic acid, N-nitrosodiphenylamine, N-(cyclohexylthio)-phthalimide (CPT), sulfonamide derivatives, diphenyl urea, bis(tridecyl)pentaerythritol-diphosphite, and the like, with N-(cyclohexylthio)-phthalimide (CPT) being preferably used.

The rubber composition containing the co-condensate of the invention can be obtained by a method including, for example, the steps of:

(A) kneading the filler and the rubber component; and
(B) kneading the kneaded product obtained in step (A) with the sulfur component and the vulcanization accelerator.

Kneading of the filler and the rubber component in step (A) can be performed using a sealed kneader such as a Banbury mixer. This kneading is generally exothermic. The temperature at the completion of kneading is preferably in the range of 140 to 180° C., and more preferably 150 to 170° C. The kneading time is about 5 minutes to 10 minutes.

Kneading of the kneaded product obtained in step (A) together with the sulfur component and the vulcanization accelerator in step (B) can be performed using an open roll or a sealed kneader such as a Banbury mixer, for example. The temperature of the kneaded product at the completion of kneading is preferably 30 to 100° C., and more preferably 60 to 90° C. The kneading time is generally about 5 minutes to 10 minutes.

Preferably, the co-condensate of the invention, and zinc oxide, an antioxidant, an oil, a fatty acid, a peptizer, and/or the like which are optionally added, are added in step (A). If a retarder is added, it is preferably added in step (B).

The rubber composition containing the co-condensate of the invention is particularly effective for vulcanization adhesion with reinforcements. Examples of such reinforcements include organic fibers such as nylon, rayon, polyester, aramid, and the like, and steel cords such as brass-plated steel cords, zinc-plated steel cords, and the like. The rubber composition containing the co-condensate of the invention is particularly effective for vulcanization adhesion with brass-plated steel cords.

A rubber article in which rubber and a reinforcement are strongly adhered can be obtained by molding the rubber composition containing the co-condensate of the invention together with the reinforcement, and subjecting the molded product to a vulcanization step. The vulcanization step is preferably performed at 120 to 180° C. The vulcanization step is performed under ordinary pressure or pressurized conditions.

EXAMPLES

The present invention will be described in more detail below, referring to examples and comparative examples, which are not intended to limit the invention.

(1) Production Examples and Physical Property Evaluation of Co-Condensates

Analysis and physical property evaluation on co-condensates were performed as follows.

a) Measurement of Average Molecular Weights of Co-Condensates

The average molecular weight of each co-condensate was calculated as the weight average molecular weight in terms of polystyrene, from the analysis by gel permeation chromatography (GPC) using the apparatus and conditions shown below:

equipment used: HLC-8220GPC (manufactured by Tosoh Corporation);
columns: TSK guard column SUPER HZ-L (manufactured by Tosoh Corporation)
plus TSK-GEL SUPER HZ1000 (4.6 mm φ×150 mm)
plus TSK-GEL SUPER HZ2500 (4.6 mm φ×150 mm)
plus TSK-GEL SUPER HZ4000 (4.6 mm φ×150 mm);
column temperature: 40° C.;
injection amount: 10 μL;
carrier and flow rate: tetrahydrofuran, 0.35 mL/min;
sample preparation: about 0.02 g of the co-condensate was dissolved in 20 mL of tetrahydrofuran.

b) Measurement of Residual Monomers and Residual Solvent

Residual monomers and residual solvent were quantified by gas chromatography based on the following conditions:
equipment used: gas chromatograph GC-14B manufactured by Shimadzu Corporation;
column: glass column 5 mm in outer diameter×3.2 mm in inner diameter×3.1 m in length;
filler: the filler Silicone OV-17 10% Chromosorb WHP 80/100 mesh, max. temp. 340° C.;
column temperature: 80° C.→280° C.;
vaporizing chamber temperature: 250° C.;
detector temperature: 280° C.;
detector: FID;
carrier: $N_2$ (40 ml/min);
combustion gas: hydrogen (60 kPa), air (60 kPa);
injection amount: 2 μL.

About 0.5 g of the co-condensate and 0.05 g of anisole as an internal standard were dissolved in 10 mL of acetone, and the mixture was analyzed under the above-shown conditions. The residual solvent content (%) and the residual monomer content (%) in the co-condensate were measured by an internal standard method (GC-IS method). Note that the contents (%) shown in the description of the examples and comparative examples are expressed in terms of wt %, unless otherwise specified.

c) Measurement of Softening Point

Softening point was measured following the method pursuant to JIS-K2207.

d) Content Ratio of Each Structural Unit in Co-Condensates $^1$H-NMR analysis was performed using a method based on the following conditions:
apparatus: "JMN-ECS" (400 MHz) manufactured by JEOL;

solvent: deuterium-substituted dimethyl sulfoxide;

chemical shift of each component: tetramethylsilane was used as a reference (0 ppm), and the peak shown at the following value was determined as the peak of each component:

protons of p-tert-butyl groups derived from p-tert-butylphenol: 1.0 to 1.2 ppm;

protons of methylene groups derived from formaldehyde: 3.4 to 3.9 ppm;

protons of o-phenyl groups derived from o-phenylphenol: 7.1 to 7.5 ppm.

Note that the structural proportions in each of the following examples and comparative examples were determined based on the following references:

o-phenylphenol: (molar) proportion when p-tert-butylphenol is taken as 1;

methylene groups derived from formaldehyde: (molar) proportion relative to the total amount of o-phenylphenol and p-tert-butylphenol.

Example 1

To a four-necked separable flask equipped with a reflux condenser and a thermometer, 97.3 g (1.2 mol) of formalin with a purity of 37%, 30.0 g (0.20 mol) of p-tert-butylphenol, 68.0 g (0.40 mol) of o-phenylphenol, and 75.4 g of toluene were sequentially added. Thereafter, the contents were heated to an internal temperature of 45° C., and 20 g (0.12 mol) of a 24% sodium hydroxide aqueous solution was added thereto and stirred until evolution of heat stopped. After the evolution of heat was confirm to have stopped, the contents were heated to an internal temperature of 65° C. and maintained at that temperature for 2 hours. Thereafter, the contents were heated again to an internal temperature of 80° C. and maintained at that temperature for additional 4 hours.

After the completion of the reaction, the contents were cooled to an internal temperature of 65° C. or lower, 49 g of water and 7.55 g (1.13 mol) of oxalic acid dihydrate were added for neutralization, and 22.6 g of toluene was added; thereafter, the mixture was allowed to stand, and the aqueous layer was removed.

Resorcin was added in an amount of 62.7 g (0.57 mol), the contents were heated to an internal temperature of 70° C., and azeotropic dehydration was performed under reduced pressure over 4 hours. During this period, the internal temperature increased to 90° C. The contents were then heated to an internal temperature of 115° C. at atmospheric pressure, and azeotropic dehydration was performed for an hour. Thereafter, the contents were heated to an internal temperature of 145 to 150° C. and maintained at that temperature for 2 hours to distill away the solvent toluene. Thereafter, the pressure was reduced to 16 kPa while maintaining the contents at an internal temperature of 140 to 150° C., and then the contents were maintained at that temperature for 2 hours to further distill away the solvent toluene. The procedure described above yielded 173 g of an orange co-condensate.

Average molecular weight of the co-condensate: 2399; softening point of the co-condensate: 138° C.; residual toluene content in the co-condensate: 0.4%; residual p-tert-butylphenol content: 0.3%; residual o-phenylphenol content: 0.5%; residual resorcin content: 11.2%. The proportion of each structural unit in the co-condensate: o-phenylphenol: 3.01; methylene groups: 1.28.

Example 2

An orange co-condensate was obtained in an amount of 177 g as in Example 1, except that the amount of p-tert-butylphenol supplied was changed to 15.0 g (0.10 mol), and the amount of o-phenylphenol supplied was changed to 85.0 g (0.50 mol).

Average molecular weight of the co-condensate: 2160; softening point of the co-condensate: 123° C.; residual toluene content in the co-condensate: 1.1%; residual p-tert-butylphenol content: 0.0%; residual o-phenylphenol content: 0.4%; residual resorcin content: 9.5%. The proportion of each structural unit in the co-condensate: o-phenylphenol: 5.40; methylene groups: 1.33.

Comparative Example 1

To a four-necked separable flask equipped with a reflux condenser and a thermometer, 43.5 g (1.33 mol) of paraformaldehyde with a purity of 92%, 150 g (1.00 mol) of p-tert-butylphenol, and 75.0 g of toluene were sequentially added. Thereafter, the contents were heated to an internal temperature of 45° C., and 4.16 g (0.05 mol) of a 48% sodium hydroxide aqueous solution was added thereto and stirred until evolution of heat stopped. After the evolution of heat was confirm to have stopped, the contents were heated to an internal temperature of 65° C. and maintained at that temperature for 2 hours. Thereafter, the contents were heated again to an internal temperature of 80° C. and maintained at that temperature for additional 1.5 hours.

After the completion of the reaction, the contents were cooled to an internal temperature of 75° C. or lower, 3.15 g (0.025 mol) of oxalic acid dihydrate was added for neutralization, and then 110 g (1.00 mol) of resorcin was added. The contents were heated to an internal temperature of 108 to 111° C., and azeotropic dehydration was performed over 4 hours. The contents were then heated to an internal temperature of 145 to 150° C. at atmospheric pressure, and maintained at that temperature for 2 hours to distill away the solvent toluene. Thereafter, the pressure was reduced to 16 kPa while maintaining the contents at an internal temperature of 140 to 150° C., and then the contents were maintained at that temperature for 2 hours to further distill away the solvent toluene. The procedure described above yielded 286 g of an orange co-condensate.

Average molecular weight of the co-condensate: 1212; softening point of the co-condensate: 195° C. or higher; residual toluene content in the co-condensate: 2.0%; residual p-tert-butylphenol content: 2.6%; residual resorcin content: 10.0%. The proportion of each structural unit in the co-condensate: o-phenylphenol: none; methylene groups: 1.26.

Example 3

To a four-necked separable flask equipped with a reflux condenser and a thermometer, 90.0 g (1.11 mol) of formalin with a purity of 37%, 15.0 g (0.10 mol) of p-tert-butylphenol, and 85.0 g (0.50 mol) of o-phenylphenol were sequentially added. Thereafter, the contents were heated to an internal temperature of 45° C., and 20.0 g (0.12 mol) of a 24% sodium hydroxide aqueous solution was added thereto and stirred until evolution of heat stopped. After the evolution of heat was confirm to have stopped, the contents were heated to an internal temperature of 65° C. and maintained at that temperature for 1.5 hours. Thereafter, the contents were heated again to an internal temperature of 75° C. and maintained at that temperature for additional 3 hours.

After the completion of the reaction, the contents were cooled to an internal temperature of 65° C. or lower, and diluted with 77.0 g of methyl isobutyl ketone. The reaction mixture was then neutralized and stirred for 10 minutes; thereafter, the mixture was allowed to stand, and the aqueous layer was removed.

Resorcin was added in an amount of 69.3 g (0.63 mol), the contents were heated to an internal temperature of 100° C., and azeotropic dehydration was performed under a reduced pressure of 65 kPa over 4 hours. During this period, the internal temperature increased to 120° C. The contents were then heated to an internal temperature of 140° C. at atmospheric pressure, and azeotropic dehydration was performed for 2 hours. The free resorcin content at the completion of dehydration reaction was 4.8%. Thereafter, the pressure was reduced to 10 kPa while maintaining the contents at an internal temperature of 140 to 150° C., and then the contents were maintained at that temperature for 2 hours to distill away the volatile components. The procedure described above yielded 185 g of an orange co-condensate.

Average molecular weight of the co-condensate: 4003; softening point of the co-condensate: 138° C.; residual methyl isobutyl ketone in the co-condensate: 0.8%; free p-tert-butylphenol: 0.0%; free o-phenylphenol: 0.2%; free resorcin: 5.2%. The proportion of each structural unit in the co-condensate: o-phenylphenol: 5.29; methylene groups: 1.32.

Example 4

To a four-necked separable flask equipped with a reflux condenser and a thermometer, 90.0 g (1.11 mol) of formalin with a purity of 37%, 15.0 g (0.10 mol) of p-tert-butylphenol, and 85.0 g (0.50 mol) of o-phenylphenol were sequentially added. Thereafter, the contents were heated to an internal temperature of 45° C., and 20.0 g (0.12 mol) of a 24% sodium hydroxide aqueous solution was added thereto and stirred until evolution of heat stopped. After the evolution of heat was confirm to have stopped, the contents were heated to an internal temperature of 65° C. and maintained at that temperature for 1.5 hours. Thereafter, the contents were heated again to an internal temperature of 75° C. and maintained at that temperature for additional 3 hours.

After the completion of the reaction, the contents were cooled to an internal temperature of 65° C. or lower, and diluted with 77.0 g of methyl isobutyl ketone. The reaction mixture was then neutralized and stirred for 10 minutes; thereafter, the mixture was allowed to stand, and the aqueous layer was removed.

Resorcin was added in an amount of 69.3 g (0.63 mol), the contents were heated to an internal temperature of 100° C., and azeotropic dehydration was performed under a reduced pressure of 65 kPa over 4 hours. During this period, the internal temperature increased to 120° C. The contents were then heated to an internal temperature of 125° C. at atmospheric pressure, and azeotropic dehydration was performed for 4 hours; at this point, the free resorcin content was analyzed and found to be 7.1%. Azeotropic dehydration was further performed at the same temperature for additional 4 hours. The free resorcin content was found to be 4.7%. Thereafter, the contents were heated to an internal temperature of 145° C., the pressure was reduced to 10 kPa while maintaining the contents at an internal temperature of 140 to 150° C., and then the contents were maintained at that temperature for 2 hours to distill away the volatile components. The procedure described above yielded 184 g of an orange co-condensate.

Average molecular weight of the co-condensate: 3487; softening point of the co-condensate: 149° C.; residual methyl isobutyl ketone in the co-condensate: 0.8%; free p-tert-butylphenol: 0.1%; free o-phenylphenol: 0.1%; free resorcin: 4.7%. The proportion of each structural unit in the co-condensate: o-phenylphenol: 5.15; methylene groups: 1.33.

Example 5

To a four-necked separable flask equipped with a reflux condenser and a thermometer, 90.0 g (1.11 mol) of formalin with a purity of 37%, 15.0 g (0.10 mol) of p-tert-butylphenol, and 85.0 g (0.50 mol) of o-phenylphenol were sequentially added. Thereafter, the contents were heated to an internal temperature of 45° C., and 20.0 g (0.12 mol) of a 24% sodium hydroxide aqueous solution was added thereto and stirred until evolution of heat stopped. After the evolution of heat was confirm to have stopped, the contents were heated to an internal temperature of 65° C. and maintained at that temperature for 1.5 hours. Thereafter, the contents were heated again to an internal temperature of 75° C. and maintained at that temperature for additional 3 hours.

After the completion of the reaction, the contents were cooled to an internal temperature of 65° C. or lower, and diluted with 77.0 g of methyl isobutyl ketone. The reaction mixture was then neutralized and stirred for 10 minutes; thereafter, the mixture was allowed to stand, and the aqueous layer was removed.

Resorcin was added in an amount of 69.3 g (0.63 mol), the contents were heated to an internal temperature of 90° C., and azeotropic dehydration was performed under a reduced pressure of 65 kPa over 4 hours. During this period, the internal temperature increased to 115° C. Azeotropic dehydration was then performed for 4 hours while maintaining the contents at an internal temperature of 115° C. under a reduced pressure of 55 kPa; at this point, the free resorcin content was analyzed and found to be 10.1%. The azeotropic dehydration reaction was subsequently performed for 4 hours while maintaining the contents at 115° C., and the free resorcin content was similarly analyzed and found to be 8.7%. The azeotropic dehydration reaction was similarly performed for additional 4 hours while maintaining the contents at 115° C.; at this stage, the free resorcin content was similarly analyzed and found to be 8.0%. Since the residual content of resorcin showed substantially no difference from the residual content of it at the completion of 8 hours of the azeotropic dehydration reaction, the contents were heated to an internal temperature of 145° C., and the pressure was reduced to 10 kPa while maintaining the contents at an internal temperature of 140 to 150° C., to distill away the volatile components at the same temperature and the same reduced pressure for 2 hours. The procedure described above yielded 183 g of an orange co-condensate.

Average molecular weight of the co-condensate: 2989; softening point of the co-condensate: 139° C.; residual methyl isobutyl ketone in the co-condensate: 1.4%; free p-tert-butylphenol: 0.0%; free o-phenylphenol: 0.2%; free resorcin: 6.1%. The proportion of each structural unit in the co-condensate: o-phenylphenol: 5.17; methylene groups: 1.32.

Example 6

To a four-necked separable flask equipped with a reflux condenser and a thermometer, 97.3 g (1.2 mol) of formalin with a purity of 37%, 15.0 g (0.10 mol) of p-tert-butylphenol, 85.0 g (0.50 mol) of o-phenylphenol, and 77.0 g of toluene were sequentially added. Thereafter, the contents were heated to an internal temperature of 45° C., and 20 g (0.12 mol) of a 24% sodium hydroxide aqueous solution was added thereto and stirred until evolution of heat stopped. After the evolution of heat was confirm to have stopped, the contents were heated to an internal temperature of 65° C. and maintained at that temperature for 2 hours. Thereafter, the contents were heated again to an internal temperature of 80° C. and maintained at that temperature for additional 4 hours.

After the completion of the reaction, the contents were cooled to an internal temperature of 65° C. or lower, and diluted with 23.0 g of toluene. The reaction mixture was then neutralized and stirred for 10 minutes; thereafter, the mixture was allowed to stand, and the aqueous layer was removed.

Resorcin was added in an amount of 62.7 g (0.57 mol), the contents were heated to an internal temperature of 70° C., and azeotropic dehydration was performed under a reduced pressure of 65 kPa over 4 hours. During this period, the internal temperature increased to 90° C. The contents were then heated to an internal temperature of 115° C. at atmospheric pressure, and azeotropic dehydration was performed for 2 hours. The free resorcin content at the completion of dehydration reaction was 12.7%. Thereafter, the contents were heated to an internal temperature of 145 to 150° C. and maintained at that temperature for 2 hours to distill away the volatile components. Thereafter, the pressure was reduced to 16 kPa while maintaining the contents at an internal temperature of 140 to 150° C., and then the contents were maintained at that temperature for 2 hours to further distill away the volatile components. The procedure described above yielded 177 g of an orange co-condensate.

Average molecular weight of the co-condensate: 2160; softening point of the co-condensate: 123° C.; residual toluene in the co-condensate: 1.1%; free p-tert-butylphenol: 0.0%; free o-phenylphenol: 0.4%; free resorcin: 9.5%. The proportion of each structural unit in the co-condensate: o-phenylphenol: 5.40; methylene groups: 1.33.

Comparative Example 2

An orange co-condensate was obtained in an amount of 164 g as in Example 6, except that the amount of resorcin was changed to 51.5 g (0.47 mol). The free resorcin content at the completion of dehydration reaction was 6.8%.

Average molecular weight of the co-condensate: 5246; softening point of the co-condensate: 160° C.; residual toluene in the co-condensate: 0.4%; free p-tert-butylphenol: 0.1%; free o-phenylphenol: 0.9%; free resorcin: 4.1%. The proportion of each structural unit in the co-condensate: o-phenylphenol: 5.05; methylene groups: 1.24.

Comparative Example 3

A brown co-condensate was obtained in an amount of 173 g as in Example 5, except that the amount of p-tert-butylphenol used was changed to 90.0 g (0.60 mol), and o-phenylphenol was not used. The free resorcin content at the completion of dehydration reaction was 4.6%.

Average molecular weight of the co-condensate: 1968; softening point of the co-condensate: 200° C. or higher; residual methyl isobutyl ketone in the co-condensate: 0.8%; free p-tert-butylphenol: 0.1%; free o-phenylphenol: none; free resorcin: 4.6%. The proportion of each structural unit in the co-condensate: o-phenylphenol: none; methylene groups: 1.08.

(2) Production Examples and Physical Property Evaluation of Rubber Compositions Containing Co-Condensate (2-1) Production of Unvulcanized Rubber Compositions Containing Co-Condensate Obtained in Examples Above The co-condensates produced in Examples 2 and 3, as well as a commercially available resin adhesive, SUMIKA-NOL 620 (manufactured by Taoka Chemical Co., Ltd.), as a conventional product, having the physical properties shown in Table 1 below, were selected as resin adhesives. The unit % in Table 1 expresses wt %.

TABLE 1

| Items | Referential Example | Example 7 | Example 8 |
|---|---|---|---|
| Resin Adhesive | SUMIKANOL 620 | Example 2 | Example 3 |
| Softening Point (° C.) | 103 | 123 | 138 |
| Free Phenols (%)*[1] | 10.1 | 0.4 | 0.2 |
| Free Resorcin (%) | 8.2 | 9.5 | 5.2 |
| Type of Residual Solvent | Toluene | Toluene | Methyl Isobutyl Ketone |
| Residual Amount (%) | 2.2 | 1.1 | 0.8 |

*[1]The term "Free Phenols" represents a total amount of p-tert-octylphenol and p-cresol for SUMIKANOL 620, and represents a total amount of p-tert-butylphenol and o-phenylphenol for present Examples 2 and 3. The term "Residual Amount" in Table 1 represents a residual amount of solvent (wt %).

In accordance with each of the formulations shown in Table 2 below, components except for insoluble sulfur, the vulcanization accelerator, and the methylene donor, as well as the resin adhesive shown in Table 1, were added and mixed in a pressure-type kneader manufactured by Toshin Co., Ltd., and were discharged when the temperature reached 160° C. The resulting mixture was then added and mixed with insoluble sulfur, the vulcanization accelerator, and the methylene donor in a 6-inch open roll manufactured by Kansai Roll Co., Ltd., maintained at 60° C., to prepare a rubber composition for a steel cord coating. The details of each of the components shown in Table 2 are as follows. The values in Table 2 represent parts by weight.

Natural Rubber: SMR-CV60;
Carbon Black: "SEAST 300" (HAF-LS grade) manufactured by Tokai Carbon Co., Ltd.;
Zinc Oxide: zinc oxide type II manufactured by Seido Chemical Industry Co., Ltd.;
Antioxidant: "ANTIOXIDANT FR" manufactured by Matsubarasangyo Corporation;
Cobalt Salt: cobalt stearate (reagent);
Insoluble Sulfur: "CRYSTEX HS OT-20" manufactured by Flexsys;
Vulcanization Accelerator: N,N-dicyclohexyl-2-benzothiazolyl sulfenamide (reagent);
Methylene Donor: "SUMIKANOL 507AP" manufactured by Bara Chemical Co., Ltd.

TABLE 2

| Items | Referential Example | Example 7 | Example 8 |
|---|---|---|---|
| Natural Rubber | 100 | ← | ← |
| Carbon Black | 60 | ← | ← |
| Zinc Oxide | 10 | ← | ← |
| Antioxidant | 2 | ← | ← |
| Cobalt Salt | 1 | ← | ← |
| Resin Adhesive | 2 | ← | ← |
| Insoluble Sulfur | 7 | ← | ← |
| Vulcanization Accelerator | 1 | ← | ← |
| Methylene Donor | 3 | ← | ← |

(2-2) Rubber Physical Property Test on Unvulcanized Rubber Compositions Containing Co-Condensate Obtained in Each of Examples Above and Referential Example A Mooney viscosity test (pursuant to JIS K 6300-1: 2001, measured at 130° C.) and a rheometer test (pursuant to JIS K 6300-2: 2001, measured at 160° C.) were performed on the unvulcanized rubber compositions obtained as above. Furthermore, after the preparation of unvulcanized test pieces, they were allowed to stand at room temperature for 24 hours, and then vulcanized under the following conditions: 160° C., an applied pressure of 6 MPa, and t 90+5 minutes. In this way, vulcanized rubber sheets with a thickness of 2 mm were prepared. Next, a tensile test (pursuant to JIS K 6251: 2010, measured at 25° C.) and hardness measurements (pursuant to JIS K 6253: 2006, measured at 25° C.) were performed on rubber test pieces prepared from these vulcanized rubber sheets.

For each of the results of the rubber physical property test described above, a relative evaluation was performed taking the value of the referential example above as 100. The results are shown in Table 3.

TABLE 3

| Items | Referential Example | Example 7 | Example 8 |
|---|---|---|---|
| Resin Adhesive (Methylene Acceptor) | SUMIKANOL 620 | Example 2 | Example 3 |
| Mooney Viscosity ML (1 + 4) at 130° C. | 100 | 96 | 98 |
| Rotorless Rheometer MH at 160° C. (dN · m) | 100 | 100 | 101 |
| t 10 at 160° C. (min) | 100 | 100 | 100 |
| t 90 at 160° C. (min) | 100 | 97 | 99 |
| Tensile Stress M100 (MPa) | 100 | 97 | 97 |
| Tensile Strength (at break) Tb (MPa) | 100 | 102 | 92 |
| Elongation (at break) Eb (%) | 100 | 105 | 97 |
| Hardness HS | 100 | 101 | 98 |

(2-3) Methods for Evaluating Initial Adhesiveness and Wet-Heat Adhesiveness of Unvulcanized Rubber Compositions Containing Co-Condensate Obtained in Each of Examples Above and Referential Example, as well as Evaluation Results Thereof A test piece of a rubber-steel cord composite was prepared using each of the unvulcanized rubber compositions obtained as above. Specifically, an unvulcanized test piece for a peel adhesion test was prepared as follows. Five brass-plated steel cords (diameter: about 0.8 mm; 3×0.20+6×0.35 mm structure; brass plating of copper/zinc=64/36 (weight ratio)) were arranged at an interval of a single steel cord/10 mm and coated on both sides with an unvulcanized rubber sheet with a thickness of about 2 mm formed from each of the unvulcanized rubber compositions described above, and then these cords were laminated in parallel. The resulting unvulcanized test piece was evaluated for initial adhesiveness and wet-heat adhesiveness, using the following methods.

a) Initial Adhesiveness

After the preparation of the unvulcanized test piece described above, it was allowed to stand at room temperature for 24 hours, and then vulcanized under the following conditions: 160° C., an applied pressure of 6 MPa, and t 90+5 minutes. In this way, a 1 cm×1 cm×6 cm rectangular parallelepiped rubber piece through which 1 cm of the five steel cords were inserted was obtained. This rubber piece was subjected to a pullout test of the steel cords for each cord, using the Autograph "AGC-X" manufactured by Shimadzu Corporation, and the stress generated when vertically pulling out each steel cord at 100 mm/min was measured as the rubber pullout stress (kgf). Furthermore, the rubber coverage of the pulled-out steel cord was visually observed, and evaluated as 0 to 100%.

b) Wet-Heat Adhesiveness (Adhesiveness after Steam Aging)

After the preparation of the unvulcanized test piece described above, it was allowed to stand at room temperature for 24 hours, and then vulcanized under the conditions of 160° C.×t 90+5 minutes, and the vulcanized test piece was allowed to stand for 168 hours under an environment of 80° C.×95% RH. The vulcanized test piece was then subjected to the same pullout test as that for initial adhesiveness described above, and the rubber coverage of the pulled-out steel cord was visually observed and evaluated as 0 to 100%.

For each of the results of the rubber-steel cord adhesion test described above, a relative evaluation was performed taking the value of the referential example above as 100. The results are shown in Table 4.

TABLE 4

| Items | Referential Example | Example 7 | Example 8 |
|---|---|---|---|
| Resin Adhesive (Methylene Acceptor) | SUMIKANOL 620 | Example 2 | Example 3 |
| Initial Pullout Strength (kgf) | 100 | 103 | 97 |
| Initial Rubber Coverage (%) | 100 | 100 | 98 |
| Pullout Strength (kgf) after Wet-Heat Aging | 100 | 97 | 95 |
| Rubber Coverage (%) after Wet-Heat Aging | 100 | 98 | 95 |

The invention claimed is:
1. A co-condensate comprising:
a structural unit derived from p-tert-butylphenol represented by Formula (1):

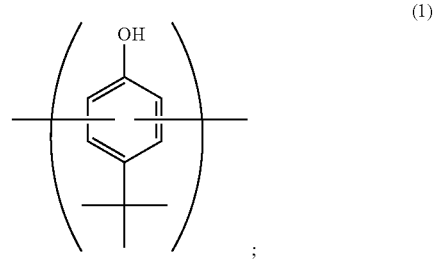

a structural unit derived from o-phenylphenol represented by Formula (2):

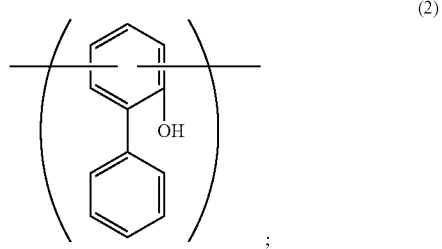

and a structural unit derived from resorcin represented by Formula (3):

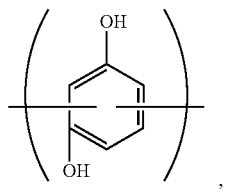

(3)

and a structural unit derived from an aldehyde the co-condensate having a softening point of 150° C. or lower.

2. The co-condensate according to claim 1, wherein a free resorcin content is 5 wt % or lower.

3. The co-condensate according to claim 1, wherein the co-condensate is a condensate of p-tert-butylphenol, o-phenylphenol and resorcin, and formaldehyde.

4. A method for producing the co-condensate according to claim 1, comprising:

(1) reacting a mixture of p-tert-butylphenol and o-phenylphenol with an aldehyde in the presence of an alkali; and (2) further reacting resorcin in a 0.8-fold molar amount or more relative to a total amount of p-tert-butylphenol and o-phenylphenol, wherein step (1) is performed prior to step (2).

5. The method for producing the co-condensate according to claim 4, comprising:

reacting the mixture of p-tert-butylphenol and o-phenylphenol with an aldehyde in the presence of the alkali; and mixing the resulting co-condensate with resorcin, and reacting the mixture at 120° C. or higher in the presence of a solvent, the solvent being present in a 0.2-fold amount by weight or more relative to the total amount of p-tert-butylphenol and o-phenylphenol, until the free resorcin content in the reaction mixture is reduced to 5 wt % or less.

6. The method for producing the co-condensate according to claim 4, wherein resorcin is used in a 2.0-fold molar amount or less relative to the total amount of p-tert-butylphenol and o-phenylphenol.

7. A rubber composition comprising the co-condensate according to claim 1.

8. The method according to claim 4, wherein the aldehyde is formaldehyde.

9. The method according to claim 5, wherein the aldehyde is formaldehyde.

10. The rubber composition according to claim 7, wherein the aldehyde is formaldehyde.

* * * * *